April 23, 1929.    H. G. KELLOGG    1,710,262
METHOD FOR FORMING FASHIONED MOLDING
Filed Jan. 5, 1925    5 Sheets-Sheet 1
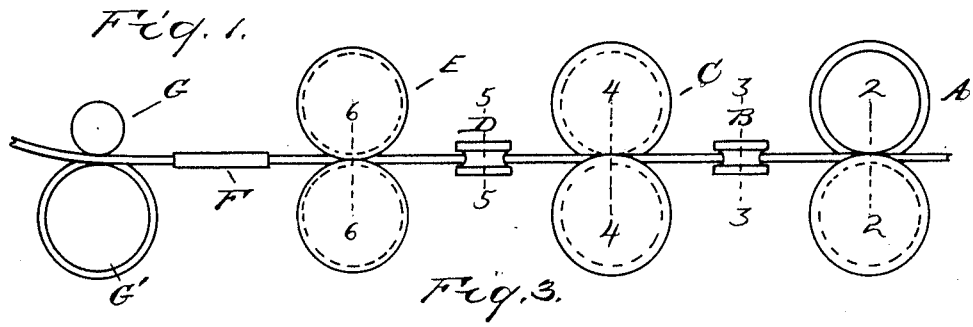
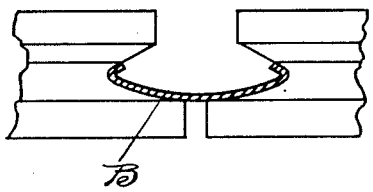
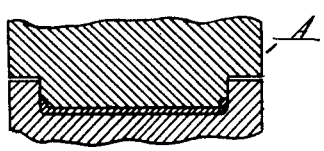
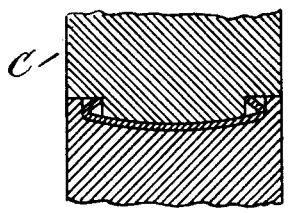
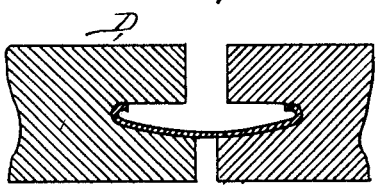
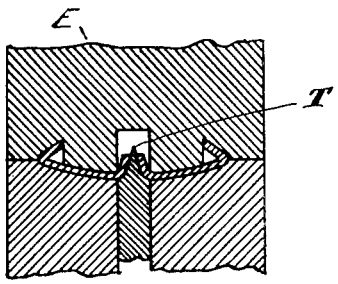
Inventor
Homer G. Kellogg
By Whittemore Hulbert Whittemore
 Belknap
    Attorneys

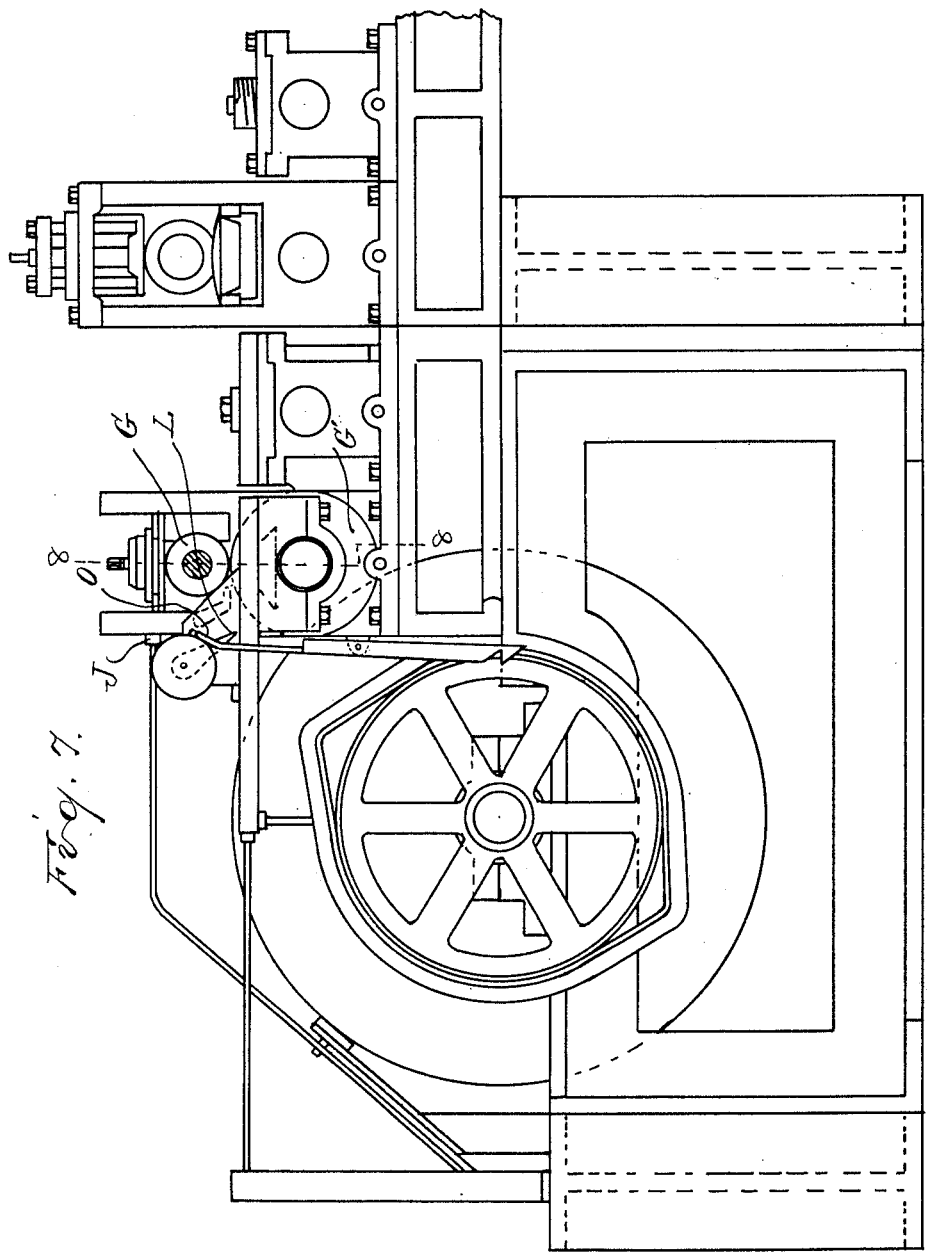

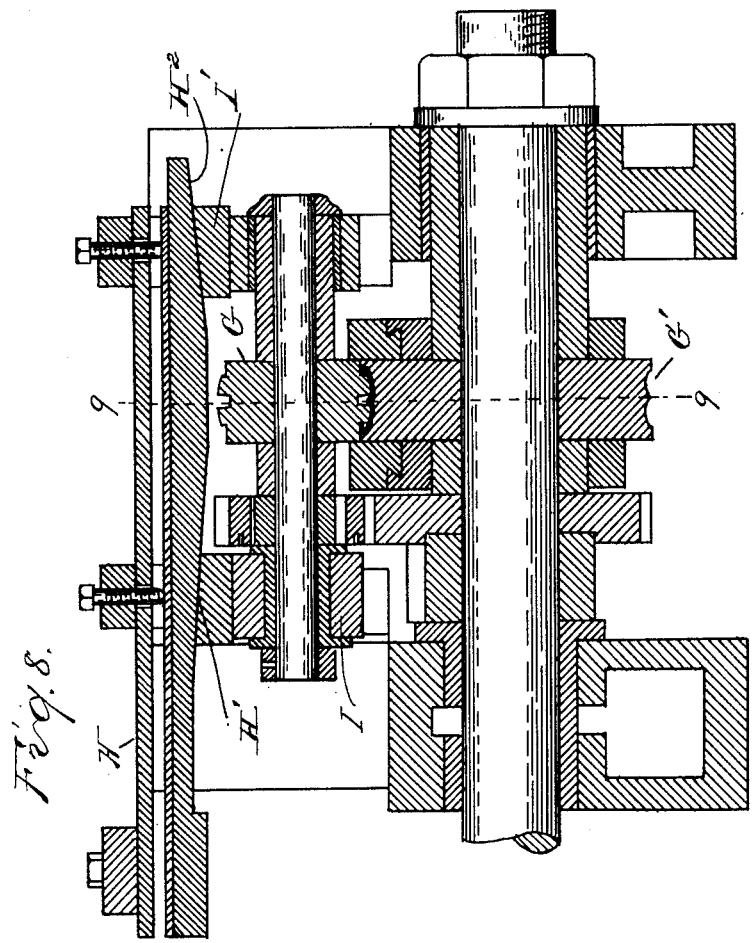

April 23, 1929.  H. G. KELLOGG  1,710,262
METHOD FOR FORMING FASHIONED MOLDING
Filed Jan. 5, 1925  5 Sheets-Sheet 4

Inventor
Homer G. Kellogg

By Whittemore Hulbert Whittemore
 Belknap
  Attorneys

April 23, 1929.  H. G. KELLOGG  1,710,262
METHOD FOR FORMING FASHIONED MOLDING
Filed Jan. 5, 1925  5 Sheets-Sheet 5

Inventor
Homer G. Kellogg

By Whittemore Hulbert Whittemore
& Belknap
Attorneys

Patented Apr. 23, 1929.

1,710,262

UNITED STATES PATENT OFFICE.

HOMER G. KELLOGG, OF DETROIT, MICHIGAN, ASSIGNOR TO MOTOR PRODUCTS CORPORATION, OF DETROIT, MICHIGAN, A CORPORATION OF NEW YORK.

METHOD FOR FORMING FASHIONED MOLDING.

Application filed January 5, 1925. Serial No. 678.

The invention relates to the manufacture of moldings such as are used on automobile bodies for concealing the joint between adjacent panels and for other purposes. Such moldings are usually formed from sheet metal strips which are fashioned to the desired cross-sectional contour by passing through forming rolls. It is, however, necessary for certain uses that the molding should be fashioned in longitudinal contour as well as in cross-section so as to conform to the shape of the automobile body; also to conceal the attachment means for the molding, and to avoid marring of the finish it is desirable to provide a snap-on cover which exactly corresponds in form to the body strip.

It is the object of the invention to provide a method of manufacturing moldings as above described by which the molding is not only formed in cross sectional contour, but may also be fashioned longitudinally to any predetermined shape. It is a further object to obtain uniformity in the product so that moldings thus formed are interchangeable and that in quantity production any one of a series of cover strips may be engaged with any one of a corresponding series of base strips. Still further it is an object to produce this result by substantially automatic machines, which, when once set, require no further skill on the part of the attendant. With these and other objects in view the invention consists in the method as hereinafter set forth.

In the drawings:

Figure 1 is a diagrammatic elevation of a machine for carrying out my improved method.

Figures 2, 3, 4, 5 and 6 are cross-sections respectively on lines 2—2; 3—3; 4—4; 5—5 and 6—6 of Figure 1.

Figure 7 is a side elevation of a portion of the machine diagrammatically shown in Figure 1.

Figure 8 is a transverse section therethrough on line 8—8 of Figure 7.

Figure 9:
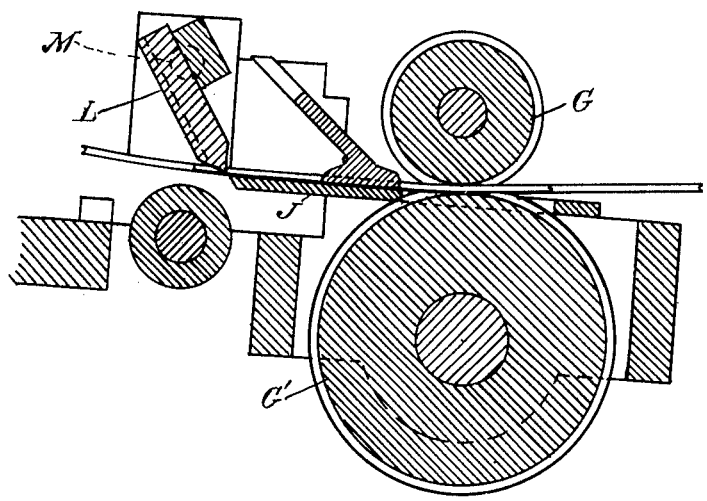
Figure 9 is a section on line 9—9 of Figure 8.
Figure 10:
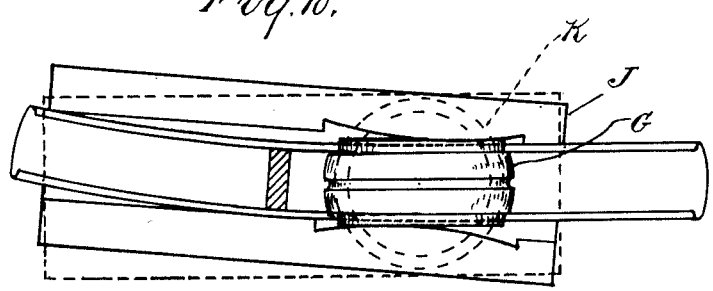
Figure 10 is a diagrammatic plan view of Figure 9.
Figure 11:
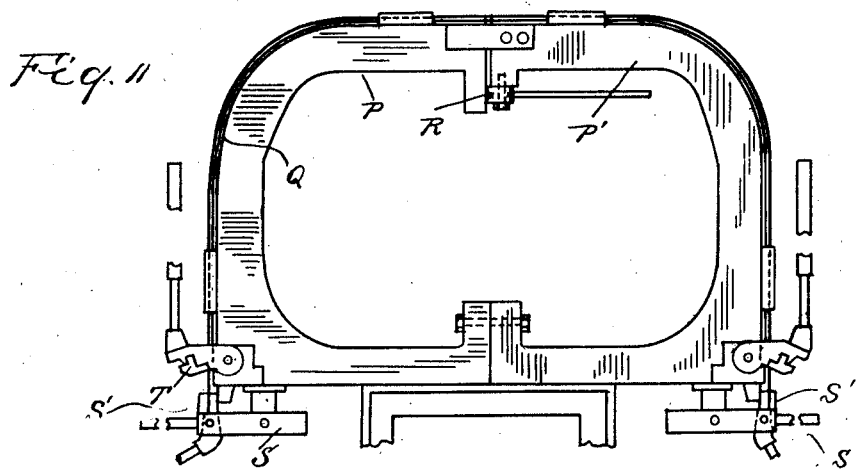
Figure 11 is a side elevation of a machine for standardizing the formed molding strips.
Figure 12:
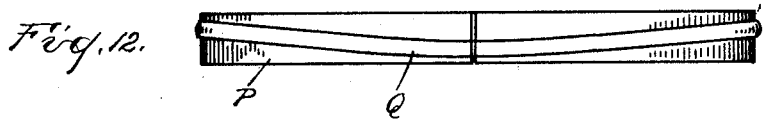
Figure 12 is a plan view thereof.

In the present state of the art moldings have been formed by passing metallic strips successively through a series of forming rolls which hold the edge portions and also fashion to the desired cross-sectional contour. The product of such apparatus is, however, a straight strip, which necessitates further bending to fashion the same to the desired longitudinal contour. Where this second operation is performed by hand, it is extremely difficult to form a series of strips of exactly the same shape and thus, if cover strips are used, each must be fitted to a particular base strip.

With my improved method the fashioning of the strip in longitudinal contour may be predetermined, and furthermore each individual strip may be conformed to an exact standard so as to be interchangeable with other strips of the same design.

While my improved method may be carried out with different forms of apparatus, I preferably employ two machines, one for fashioning the strip in cross-sectional and longitudinal contour and cutting it off to the desired length and the other for conforming the strip thus fashioned to an exact pattern.

The machine used for fashioning the strip comprises a series of pairs of forming rolls A, B, C, D and E, respectively illustrated in Figures 2, 3, 4 5 and 6, which change the cross-section from the flat strip to the desired finished cross-sectional contour. If, however, the finished strip were directly delivered from the rolls E, it would be substantially straight in longitudinal contour and to change this to the desired fashioned contour requires further manipulation.

As shown, there is arranged in alignment with the finishing rolls E a grooved guide F which straightens the strip. Beyond this guide is a pair of rolls G, G' which are of substantially the same contour as the rolls E, but which are capable of varying the pressure on opposite edge portions of the strip. Such variation is accomplished by a laterally movable bar H extending transversely of the machine above the roll G and having cam bearings H' and H² for engaging vertically adjustable journal bearings I and I' for said roll G. Thus when the bar H is moved in one direction, it will increase the pressure of the roll G against the roll G′ on one side of the machine and when moved in the opposite direction will increase the pressure of said roll upon the opposite side of the machine. This increase in pressure upon the strip passing between the rolls will vary the gauge thereof so as to curve the strip in one direction or another, as desired.

To further fashion the strip longitudinally there is arranged beyond the rolls G, G′ a universally movable guide or nozzle through which the strip passes and by which it is bent in transverse planes. This nozzle J is preferably pivoted concentric with the axis of the roll G′ to turn in a vertical plane and is also pivoted about a vertical axis, indicated at K, to turn in a horizontal plane. The nozzle extends into the delivery throat between the rolls G, G′ and in close proximity thereto, so that the bending will be effected against the resistance of the clamping pressure of said rolls. This will stretch or compress the metal of the strip sufficiently to produce a curve of the desired radius in either horizontal or vertical planes, and therefore, by adjusting the nozzle to the desired degree, any predetermined longitudinal contour may be imparted to the strip.

The mechanism heretofore set forth is driven in properly timed relation by suitable gearing, not described in detail, so that the complete operation of the machine is as follows: When a flat strip is passed between the rolls A, C and E, it will be progressively changed in cross sectional contour as shown in Figures 2 to 6 inclusive. The steps, as specifically shown are; first, turning up the edges of the flanges; second, return bending these flanges and simultaneously bowing the intermediate portion of the section; third, rolling said section to the desired curvature; and fourth, puncturing the strip at intervals by the points T on the roll E. From the rolls E the fashion strip passes through the straight guide F which takes out any longitudinal curvature incident to the forming action. The strip then passes between the rolls G and G′ and into the nozzle J. This nozzle is moved through a predetermined path swinging both horizontally and vertically according to the pattern determined by the cam M′ and this pattern is such that it will impart the desired curvature or bends to the strip.

The strip fashioned as just described must be periodically cut off at the completion of each cycle of movement of the nozzle, which is preferably effected by a severing blade L. This as shown is pivotally supported on a pin M above the strip and is normally held clear of the strip by a stop O. Such stop is periodically tripped to permit the blade to fall upon the strip and by the pressure of its edge to sever the section.

Figure 13:
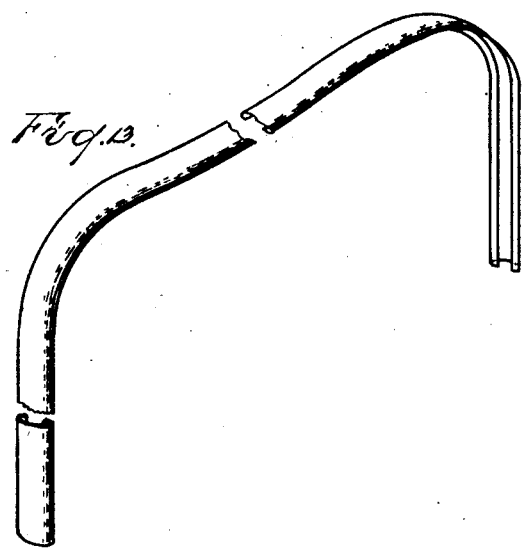
Figure 13 is a perspective view of the completed molding.

The product of the machine as thus far described is illustrated in Figure 13, which, as specifically shown, is of a substantially U-shaped form, but is curved in transverse planes. To eliminate any accidental irregularities, the strip thus formed is conformed to a master or fashioned guide, preferably as follows: P is a frame which has mounted thereon the master strip or fashioned guide Q fashioned in cross section to engage the cross section of the molding and fashioned in longitudinal contour to the predetermined form. The frame P is preferably formed in two sections P and P′ on opposite sides of the longitudinal center and movable in relation to each other by means of the cam R. There are also provided at opposite sides of the frame members P and P′ levers S provided with clamps S′ for engaging the ends of the strip and drawing it downward over the guide. Still further there are provided the members T for severing the strip above the clamped portion.

In operation, the moldings are successively placed in engagement with the master, are clamped and stretched downward by the levers S, after which the cam R is manipulated to move the sections P and P′ outward from each other. This will stretch the metal of the strip throughout its entire length and will cause it to permanently retain the longitudinal contour of the master or fashioned guide. The severing blades L are then manipulated to cut off the strip and to fashion the end portions thereof. Thus all moldings which are conformed to the same master will be interchangeable and where there are cover strips for engaging base strips, each cover will fit in one of the base strips.

The specific construction of apparatus forms the subject matter of my co-pending application Serial No. 747,660, filed Nov. 3, 1924.

What I claim as my invention is:

1. The method of forming fashioned moldings comprising the progressive advancement of a strip, fashioning said strip during its advancement to a predetermined cross-sectional contour and variably guiding said strip into planes angularly arranged with respect to each other while delivered from the cross section forming means to fashion the longitudinal contour thereof.

2. The method of forming fasioned moldings comprising progressively advancing a strip, fashioning said strip during advancement to a predetermined cross sectional contour, variably guiding the strip in angularly arranged directions while delivered from said cross section forming means to fashion the longitudinal contour thereof, and in periodically severing the strip.

3. The method of forming fashioned moldings comprising the progressive advancement of a strip, fashioning the cross section of said strip during advancement and subjecting the strip as delivered from the cross section forming means to pressure in variable directions to fashion the longitudinal contour thereof.

4. The method of forming interchangeable fashioned moldings comprising the successive forming of said moldings to approximate a predetermined cross sectional and longitudinal contour, and in straining the strip while in engagement with a master to permanently retain the form thereof.

5. The method of forming interchangeable fashioned moldings comprising the successive forming of said moldings to approximate a predetermined cross sectional and longitudinal contour, engaging the formed strip with a master or fashioned guide, and stretching the strip while in engagement with said master to permanently retain the form thereof.

6. The method of forming interchangeable pairs of fashioned body and cover moldings comprising similarly fashioning the body and cover strips to approximate a predetermined cross sectional and longitudinal contour, engaging said body and cover strips with corresponding masters and in straining the strips while engaged with said masters to permanently retain the form thereof.

7. A series of steps in the method of forming fashioned moldings comprising the progressive advancement of a strip, fashioning the cross section of said strip during advancement and subjecting the edges of the strip to a differential pressure to aid in fashioning the longitudinal contour thereof.

8. A series of steps in the method of forming fashioned moldings comprising the progressive advancement of a strip, fashioning the cross section of said strip during advancement and subjecting the edges of said strip as delivered from the cross section fashioning means to variable pressure to aid in fashioning the longitudinal contour thereof.

9. The method of forming fashioned moldings comprising the progressive advancement of a strip, fashioning the cross section of said strip during advancement and in bending said strip in planes angularly arranged with respect to each other as delivered from the cross section fashioning means to fashion the longitudinal contour thereof.

10. The method of forming fashioned moldings comprising the progressive advancement of a strip, fashioning the cross section of said strip during advancement, subjecting the strip to differential rolling pressure on opposite edge portions thereof, and in variably guiding the strip in angularly arranged planes as delivered from the cross section fashioning means to fashion the longitudinal contour thereof.

11. The method of forming fashioned moldings comprising the progressive rolling of a strip to fashion the cross-sectional contour thereof, subjecting said strip to differential rolling pressure on opposite edge portions thereof and in variably guiding the strip in a plurality of different directions as delivered from the rolling means to fashion the longitudinal contour thereof.

In testimony whereof I affix my signature.

HOMER G. KELLOGG.